(12) United States Patent
Stenmark

(10) Patent No.: US 8,146,735 B2
(45) Date of Patent: Apr. 3, 2012

(54) DISTRIBUTED GAS STORAGE

(75) Inventor: Lars Stenmark, Trosa (SE)

(73) Assignee: Manbas Alpha AB, Trosa (SE)

( * ) Notice: Subject to any disclaimer, the term of this patent is extended or adjusted under 35 U.S.C. 154(b) by 909 days.

(21) Appl. No.: 12/066,703

(22) PCT Filed: Sep. 14, 2006

(86) PCT No.: PCT/SE2006/050334
§ 371 (c)(1),
(2), (4) Date: Jul. 31, 2008

(87) PCT Pub. No.: WO2007/032742
PCT Pub. Date: Mar. 22, 2007

(65) Prior Publication Data
US 2008/0283420 A1    Nov. 20, 2008

(30) Foreign Application Priority Data
Sep. 15, 2005  (SE) ...................... 0502037

(51) Int. Cl.
*F17C 1/00* (2006.01)
(52) U.S. Cl. ............................. 206/0.7; 222/3
(58) Field of Classification Search ............... 96/108, 96/121; 206/0.7; 423/648.1, 658.2; 900/420; 502/526; 220/500, 581; 222/3, 394
See application file for complete search history.

(56) References Cited

U.S. PATENT DOCUMENTS

| | | | |
|---|---|---|---|
| 3,436,191 A | 4/1969 | McGoff et al. | |
| 4,165,569 A * | 8/1979 | Mackay | .......... 34/416 |
| 4,182,254 A | 1/1980 | Secord | |
| 4,187,092 A * | 2/1980 | Woolley | .......... 62/46.2 |
| 5,664,696 A | 9/1997 | Canga | |
| 6,003,727 A | 12/1999 | Marshall | |
| 6,095,367 A | 8/2000 | Blair et al. | |
| 6,432,176 B1 * | 8/2002 | Klos et al. | .......... 96/117.5 |
| 6,502,571 B1 | 1/2003 | Izuchukwu et al. | |
| 6,708,844 B2 * | 3/2004 | Lim et al. | .......... 222/3 |

(Continued)

FOREIGN PATENT DOCUMENTS
DE    101 60 701 A1    6/2003
(Continued)

OTHER PUBLICATIONS

International Search Report of PCT/SE2006/050334, date of mailing Dec. 27, 2006.

(Continued)

*Primary Examiner* — Frank Lawrence, Jr.
(74) *Attorney, Agent, or Firm* — Young & Thompson

(57) ABSTRACT

A gas storage system includes a tank, having a tank gas outlet, and a multitude of gas emitting entities encapsulated by the tank. The gas emitting entities are arranged for providing a gas volume, which when released from the gas emitting entities, is considerably larger than a volume of the gas emitting entities themselves. The gas emitting entities are freely contained in the tank. There are no gas conduits or electrical connections to the tank which has a sealable opening suitable for removal or insertion of the gas emitting entities. The latter have a respective gas release device, which is operable as a response on a stimulation signal. A volume surrounding the gas emitting entities inside the tank is the sole fluid connection between an opening of the gas release device and the tank gas outlet. Methods for storing and releasing gas are also presented.

21 Claims, 7 Drawing Sheets

U.S. PATENT DOCUMENTS

| | | | |
|---|---|---|---|
| 7,651,554 B2 * | 1/2010 | Tan et al. | 96/108 |
| 7,759,287 B2 * | 7/2010 | Salyer | 502/402 |
| 2002/0046567 A1 | 4/2002 | Pelloux-Gervais et al. | |
| 2003/0226365 A1 | 12/2003 | Bradley et al. | |
| 2005/0072786 A1 * | 4/2005 | Gagnon et al. | 220/675 |
| 2005/0109399 A1 | 5/2005 | Wodjenski et al. | |
| 2008/0035200 A1 * | 2/2008 | Chabak | 137/1 |
| 2010/0278722 A1 * | 11/2010 | Field | 423/648.1 |

FOREIGN PATENT DOCUMENTS

| | | |
|---|---|---|
| DE | 10160701 | 6/2003 |

OTHER PUBLICATIONS

European Search Report, Application No. EPO6 78 4247, dated Nov. 15, 2011.

* cited by examiner

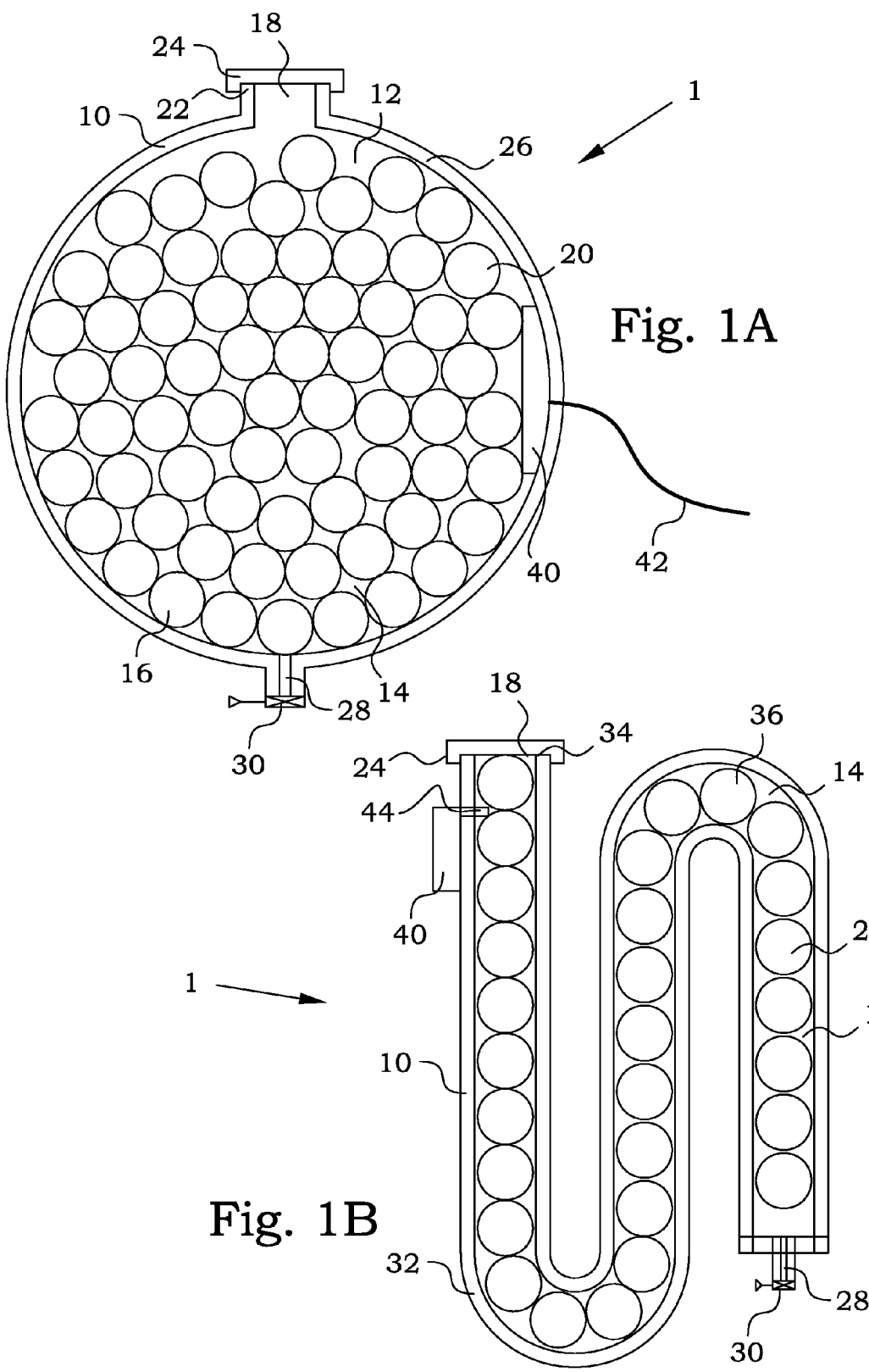

DISTRIBUTED GAS STORAGE

TECHNICAL FIELD

The present invention relates in general to storage and distribution of gas.

BACKGROUND

To store large amounts of gas under high pressure is not an easy task. Storage vessels for large volumes and high pressure become heavy and difficult to handle. Depending on the application there is also a considerable safety margin that must be taken into account, adding to the overall system mass. Releasing of gas must be done to a suitable low working pressure, which includes failure safe pressure regulators. The filling of big high pressure vessels can also be a safety issue.

In particular, there is an interest in using hydrogen for reducing the use of fossil fuels. The energy density per unit weight is very high and production is easily performed e.g. by water electrolysis. Furthermore, the exhausts do not harm the environment being plain water. Attention has been drawn also to use hydrogen as fuel in micro-power plants, e.g. in vehicles or even in personal electronics instead of battery operation. However, major drawbacks to the general use of hydrogen are connected to the high volatile properties and that it is difficult to store and distribute.

The pressure resistance of a spherical gas storage tank depends mainly on three factors. These factors are the size, the tank material, and the wall thickness. When all factors are considered, small containers represent, at least theoretically, a good solution with regard to the relation between the amount of stored gas and the total system mass. To use more than one container, when large amounts of gas are needed for a given application, is therefore quite normal. The tanks are then connected, typically in parallel, to a common pressure regulator, followed by a buffer tank for the working pressure of the fluid.

In the published US patent application US2003/0226365 A1, a hydrogen storage and supply system is disclosed. Cold containers, typically of spherical shape, stores hydrogen in porous material and hydrogen is retrieved by letting the gas exiting a port of the cold container. If several containers are used together, they are connected by a network of gas conduits.

In the published US patent application US2002/0046567 A1, hydrogen is also stored in cold containers inside one or several outer shells. Several containers may also be placed inside a common shell and are connected to each other either in a parallel or serial manner.

In the publication document DE 101 60 701 A1, gas containers arranged inside each other are disclosed. The inner and outer containers have typically different outlets. If more than one inner container is provided, the inner containers are connected in series and/or parallel to share one common outlet, however, different from the outer container outlet.

Systems of connected gas containers according to prior art become in many cases bulky and complicated. Furthermore, upon changing empty containers for filled ones, the connections to the empty containers have to be dismounted and connections to the filled ones have to be arranged for. Such procedures are time consuming and may also be hazardous if performed by non-skilled persons. Situations where gas containers are to be used in consumer products thus require additional safety arrangements.

SUMMARY

An object of the present invention is thus to provide improved systems and methods for gas handling. A further object of the present invention is to provide systems of less weight and complexity for a certain volume of gas and methods reducing the dependence for installation skill of the operator. Another object of the present invention is also to provide systems and methods for gas handling presenting a high degree of reliability and safety during transport and usage.

The above objects are achieved by systems and methods according to the enclosed patent claims. In general words, according to a first aspect, a gas storage system comprises a tank, having a tank gas outlet, and a multitude of gas emitting entities encapsulated by the tank. The gas emitting entities are arranged for providing a gas volume, which when released from said gas emitting entities, is considerably larger than a volume of the gas emitting entities themselves. Examples of gas emitting entities are propellant canisters, high-pressure gas containers and containers in which gas is mechanically trapped in a solid or liquid. The gas emitting entities are freely contained in the tank, i.e. there are no gas conduits or electrical connections between the gas emitting entities and the tank. The tank has a sealable opening suitable for removal or insertion of the gas emitting entities and the gas emitting entities have a respective gas release device, which is operable as a response on a stimulation signal. A volume surrounding the gas emitting entities inside the tank is the sole fluid connection between an opening of the gas emitting entity and the tank gas outlet.

According to a second aspect of the present invention, a method for storing gas comprises charging of a multitude of gas emitting entities to comprise a gas volume, which when released from the gas emitting entities, is considerably larger than a volume of the gas emitting entities. The method further comprises insertion of said multitude of gas emitting entities into a tank to be freely contained therein and sealing of the tank.

According to a third aspect of the present invention, a method for releasing gas from a gas storage is defined. The gas storage comprises a tank, encapsulating, freely contained therein, a multitude of gas emitting entities.

The gas emitting entities are charged to comprise a gas volume, which when released from the gas emitting entities, is considerably larger than a volume of the gas emitting entities. The method thereby comprises emitting of a stimulation signal to a release device of at least one of the gas emitting entities, releasing gas from the concerned gas emitting entities as a response to the stimulation signal into an interior of the tank, and opening of a gas outlet of the tank.

The present invention solves several problem areas or drawbacks with a conventional externally parallel connected system. The total system mass important and the mass percentage of stored gas shall be as high as possible. The present invention will reduce the support system mass and in addition increase the reliability, redundancy and safety of the system. The invention will thus reduce the total system mass and support an easy and safe handling during filling of the large total volume of pressurized gas. The invention will greatly contribute to a safe use of gas e.g. as a method for energy carrier.

BRIEF DESCRIPTION OF THE DRAWINGS

The invention, together with further objects and advantages thereof, may best be understood by making reference to the following description taken together with the accompanying drawings, in which:

FIGS. 1A-E are cross-sections through embodiments of gas storage systems according to the present invention;

DETAILED DESCRIPTION

Figure 1C:
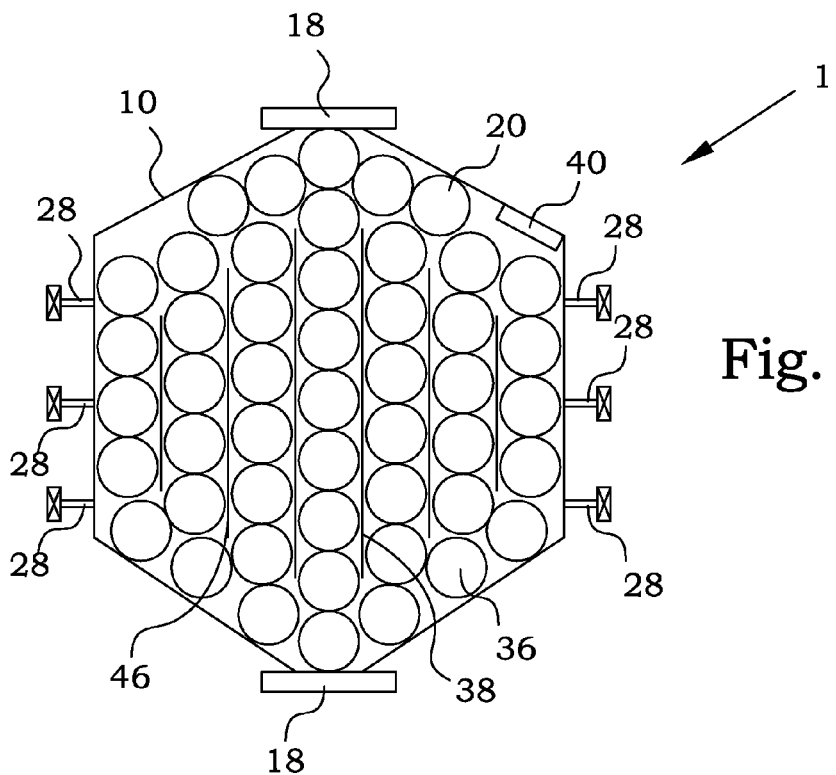

The present invention presents a solution for how to avoid handling high-pressure gas connections when storing and distributing gas. By using a multitude of relatively small gas emitting entities, the gas is distributed into small quantities. The gas emitting entities are encapsulated by a tank, freely contained therein. By "freely contained" is in the present disclosure understood as having no attached connections, neither electrical ones nor fluid conduits, between the gas emitting entities and the tank. The gas emitting entities are thereby autonomous entities, which can be in direct contact with each other or the tank wall only by mechanical support contact, or be free-flying inside the tank. The only physical contact between the gas emitting entities and the tank, if any, concerns mechanical support.

Since no separate fluid conduits are provided between the gas emitting entities and the tank, the space surrounding the gas emitting entities inside the tank will operate as a sole common fluid connection between openings of the gas emitting entities and a tank gas outlet. The tank is intended to have a gas pressure at or slightly above an intended operation pressure for the gas. Such operation pressure is typically atmospheric pressure or a moderately higher pressure. This means that any high-pressure mechanisms can be restricted to be permanently attached to the gas emitting entities. Subsequently, no attachment procedures for high-pressure components are necessary for fluidly connecting the gas emitting entities and the tank.

All gas emitting entities are located inside the tank, in an ordered pattern or randomly. The gas emitting entities can be individually or collectively activated to release their gas content, i.e. the gas emitting entities can in principle be activated one by one or all at the same time. Since no connections are available, such activation or stimulation is performed by a stimuli signal. When the gas emitting entities are properly stimulated they start to dissipate the desired gas, which is collected in all dead volumes inside the tank.

When all gas has been drained from the gas emitting entities, they should be mechanically removed from the tank and preferably replaced with filled/charged gas emitting entities. The filling/reloading/charging of the used gas emitting entities is performed outside the system. Since the filling of the gas emitting entities may be performed at another location, the gas emitting entities have to be transported between the filling and releasing locations. The gas emitting entities are relatively small, and even when charged, the gas amount in each gas emitting entity is relatively limited. This means that even if one or a few of the gas emitting entities are damaged, the consequences are small. An important preferred property for the gas emitting entities is that they should be harmless to submit to normal handling outside the tank and consequently not exposed to stimuli, independent of whether they are charged or not.

In the present disclosure, "gas emitting device" is intended to be understood as a container that is arranged for providing a gas, which when being released from the gas emitting entity, occupies a considerably larger volume than a volume of the gas emitting entity itself. In other words, a gas emitting device is a storage entity, where gas is stored in a volume reduced manner. The gas emitting device can be small a high pressure gas vessel, where the gas is stored under high pressure. The gas emitting device can also be propellant cartridge or canister, where the gas is stored in a solid chemical. The solid chemical is a substance which needs to be decomposed in order to provide the gas. A third alternative is to mechanically trap the gas in a solid or liquid contained in a container and then causing a release of said gas from the solid or liquid as a response to an externally generated stimuli signal.

FIG. 1A is a cross-section through a tank 10, being an embodiment of a gas storage system 1 according to the present invention. In the present embodiment, the tank 10 has a spherically shaped shell 26. The tank 10 is designed for a low working pressure inside, i.e. an internal volume 12 has a low working pressure, typically a few bars. The internal volume 12 is substantially filled with a large number of gas emitting devices 20, in this embodiment constituted by high-pressure gas containers 16 or sub-tanks.

The tank 10 has a sealable opening 18, which is large enough to admit the high-pressure gas containers 16 to pass. The sealable opening 18 is therefore usable for removal and insertion of high-pressure gas containers 16. The sealable opening is sealed by a cap 24 sealing against a sealing seat at flange 22 of the tank shell 26.

The tank 10 further has a tank gas outlet 28. The tank gas outlet 28 is covered by a gas flow regulator 30, which controls the gas flow out from the tank 10. The gas flow regulator 30 can be of any conventional type, suitable for regulating low or medium gas pressures. In a simplest form, the gas flow regulator 30 could be a simple valve. The gas flow regulator 30 can be controlled manually, electrically or by any other conventional means.

A stimuli signal generator 40 is in the present embodiment mounted at the inside of the spherically shaped shell 26. The stimuli signal generator 40 is arranged to emit a stimuli signal, to which the high-pressure gas containers 16 respond. These stimuli signals will be discussed more in detail further below. The stimuli signal generator 40 is in turn controlled via an electrical cable 42, attached through the spherically shaped shell 26.

Due to the shape of the high-pressure gas containers 16, there is a space 14 surrounding the gas emitting entities 20 inside the tank 10. When the high-pressure gas containers 16 are stimulated to emit gas, described more in detail further below, gas is collected in the space 14. The space 14 is in turn drained through the tank gas outlet 28. The space 14 surrounding the gas emitting entities 20 is thus the sole fluid connection between the high-pressure gas containers 16 and the tank outlet.

The tank can have any arbitrary shape, e.g. spherical, flat or tube shaped. FIG. 1B is a cross-section through another embodiment of a gas storage system 1 according to the present invention. In this embodiment, the shell has a shape of a bent tube 32. The sealable opening 18 is provided at one end of the bent tube 32, having the cap 24, sealing against an end 34 of the bent tube 32, permitting the tank to be filled or drained of gas emitting devices 20 in a convenient way. The tank gas outlet 28 is in the present embodiment provided at the opposite end of the bent tube 32. The internal volume 12 is substantially filled with a large number of gas emitting devices 20, in this embodiment constituted by containers 36 in which gas is mechanically trapped in a solid or liquid.

The stimuli signal generator 40 is in the present embodiment mounted at the outside of the tank 10. The stimuli signal generator 40 is in this embodiment connected to a pressure sensor 44, arranged in the internal volume 12 of the tank 10. When the pressure sensor 44 senses that the internal volume 12 becomes too low, the stimuli signal generator 40 is arranged to send out stimuli signals for activating the gas emission from the containers 36, and thereby keeping the internal volume 12 pressure at a suitable level.

FIG. 1C is a cross-section through another embodiment of a gas storage system 1 according to the present invention. In this embodiment, there are two sealable openings 18 provided. The lower one is intended for removing empty gas emitting entities 20 from the tank 10, and the upper one is intended for filling the tank 10 with charged gas emitting entities 20. Due to this arrangement, the gravity will assist in the emptying and filling procedures and the tank 10 can easily be arranged in a stationary configuration. In this embodiment, the tank 10 further comprises a support structure 38. In the present embodiment, the support structure 38 consists of a number of guiding rails 46, which guides the gas emitting entities 20 during filling and emptying the tank 10.

The tank 1 can be fully filled with gas emitting entities 20 or only partly as desired from one filling to another. The devices are not fixed against the internal walls of the tank 1 even if the support structure 38 can facilitate that the gas emitting entities 20 are packed in an ordered manner. The internal guiding rails 46 are of an advantage for rapid fill or drain of gas emitting entities 20. The system will therefore help to avoid a queue problem at the sealable openings 18.

The gas emitting entities 20 comprises in the present embodiment high-pressure gas containers 16 as well as containers 36 in which gas is mechanically trapped in a solid or liquid.

The tank in the present embodiment has six tank gas outlets 28. The different tank gas outlets 28 are possible to operate separately, however, utilizing the tank 10 as a common gas resource.

Figure 1D:
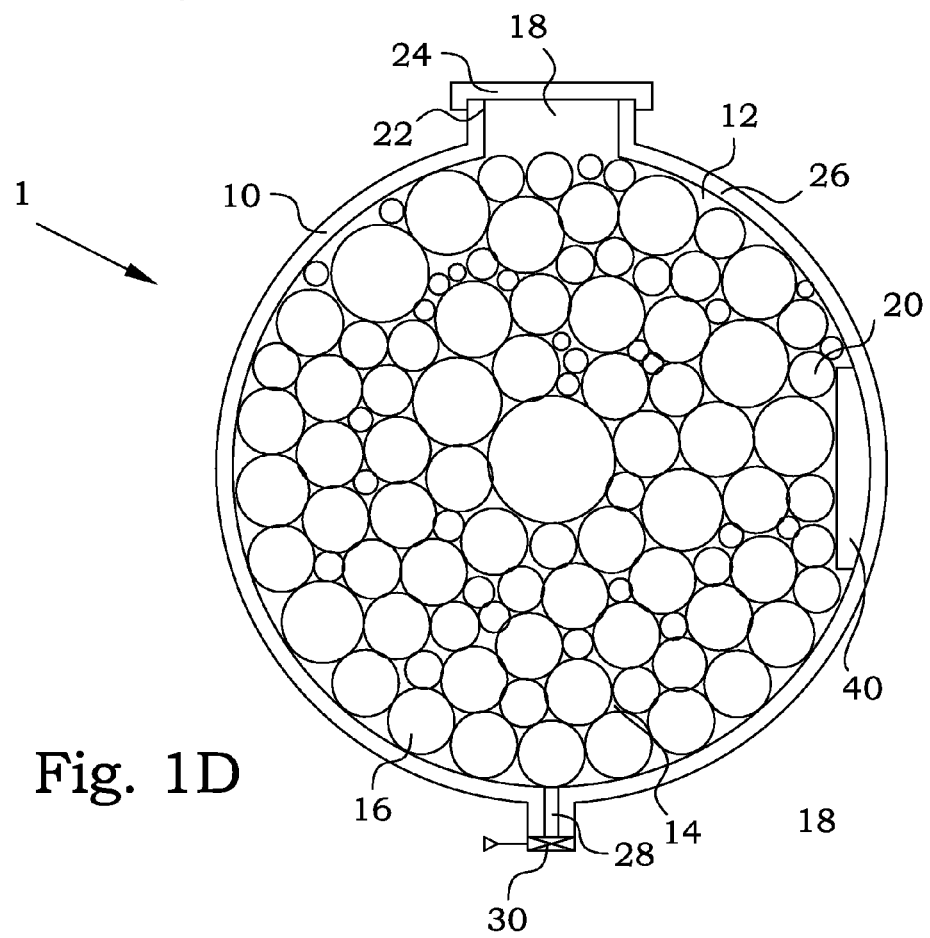

FIG. 1D is a cross-section through another embodiment of a gas storage system 1 according to the present invention. In this embodiment, the gas emitting entities 20 are of different sizes. By selecting a proper mix of sizes and/or shapes, a closer packing of the gas emitting entities 20 can be obtained. In the present embodiment, the sealable opening 18 and the tank gas outlet 28 are combined in such a way that the tank gas outlet 28 is provided in the cap 24 covering the sealable opening 18.

Figure 1E:
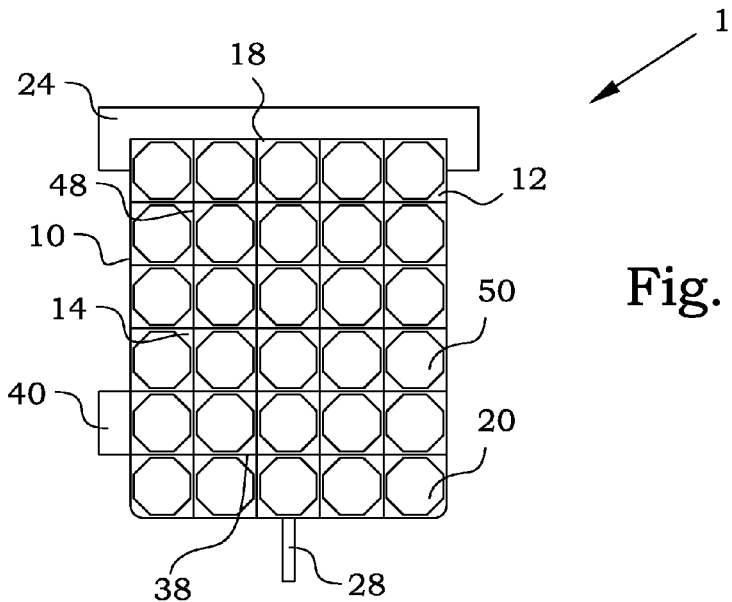

FIG. 1E is a cross-section through another embodiment of a gas storage system 1 according to the present invention. The gas emitting entities 20 are in the present embodiment propellant canisters 50, having an octahedral cross-section. In this embodiment, the gas emitting entities 20 are physically supported by a support structure 38. In the present embodiment, the support structure 38 consists of a mesh 48 in which the gas emitting entities 20 rest.

The mesh 48 assists in keeping the gas emitting entities 20 packed in an ordered manner and also as a damping system. The sealable opening 18 covers the entire upper part of the tank 10. When the propellant canisters 50 are to be replaced, the sealable opening 18 is removed and the entire mesh 48 including the propellant canisters 50 resting therein is taken out from the tank 10 and a new mesh 48 with charged propellant canisters 50 are instead inserted. The mesh 48 can thereby be used also as a transportation support.

Figure 2A:
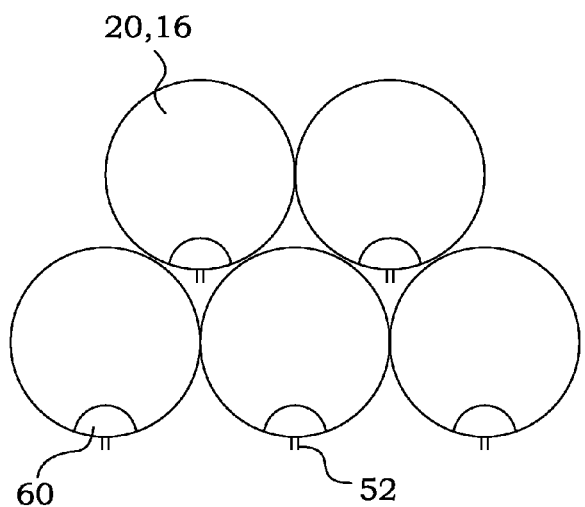
FIGS. 2A-B are schematic illustrations of embodiments of gas emitting entities according to the present invention.

FIG. 2A is an illustration of gas emitting entities 20. In this embodiment, the gas emitting entities 20 are spherical high-pressure gas containers 16. Each high-pressure gas container 16 is equipped with a gas release device 60. The gas release device 60 reacts on a stimuli signal by causing a gentle, relative slow, gas release. In the present embodiment, the gas release device 60 causes a gentle release of the high pressure gas contained in the high-pressure gas container 16. The gas release device 60 thereby controls a valve 52, preferably comprising gas flow regulation mechanisms. Without the stimuli signal is gas emitting entity 20 leak-tight and passive.

Figure 2B:
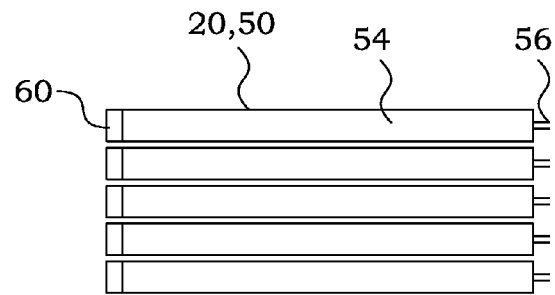

FIG. 2B illustrates another embodiment of gas emitting entities 20; propellant cartridges 50. Each propellant cartridge 50 is equipped with a gas release device 60. In the present embodiment, the gas release device 60 causes a gentle decomposing of at least a part of the solid substance 54 contained in the propellant cartridge 50. Such decomposing can be caused by providing some stimuli, e.g. by an increased temperature, an electrical signal or provision of a catalytically active material. The released gas exits an opening 56 to reach the surroundings of the propellant cartridge 50 inside the tank.

The gas release device 60 is operable as a response on a stimulation signal. The gas release stimuli signal is, as described above, generated in a separate device, a stimuli signal generator 40, which can be mounted inside or outside the tank. The stimuli signal generator 40 has no physical connection to any of the gas emitting entities 20. The signal can be conventional signals, such as electromagnetic signals. The signal can also be a change in an environmental condition generated inside the tank or an external condition that is sensed through out the volume of the buffer tank. This kind of condition could be temperature, pressure, acceleration forces, etc.

Figures 3A, 3B, 3C:
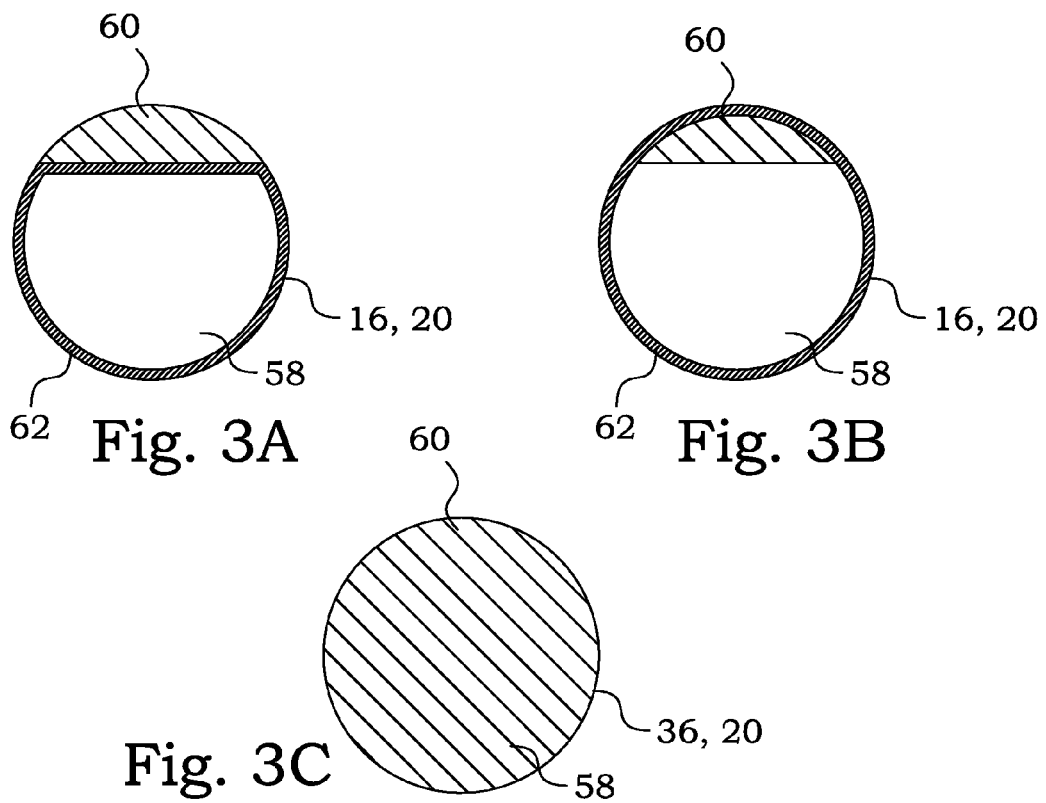
FIGS. 3A-C are schematic illustrations of embodiments of gas release device configurations of gas emitting entities according to the present invention.

FIG. 3A illustrates one embodiment of the location of a gas release device 60 of a gas emitting entity 20. In the illustrated embodiment, the gas emitting entity 20 is a high-pressure gas container 16. The high-pressure gas container 16 has three elements, a high pressure resistant shell 62, an internal volume 58 and the gas release device 60. The internal volume 58 is filled with gas under high pressure, typically up to 1000 bar or even more. The gas release device 60 is in the present embodiment located and working outside the high pressure resistant shell 62.

FIG. 3B illustrates a high-pressure gas container 16 having the gas release device 60 inside the high pressure resistant shell 62.

FIG. 3C illustrates a container 36, in which gas is mechanically trapped in a solid or liquid. In this embodiment, the gas release device 60 can even distributed through the whole internal volume 58. In the even distributed case, any pressure resistant shell is not necessarily needed, since the whole sphere can be filled with gas storing material homogenous distributed throughout the whole volume together with the gas release function.

Figure 4:
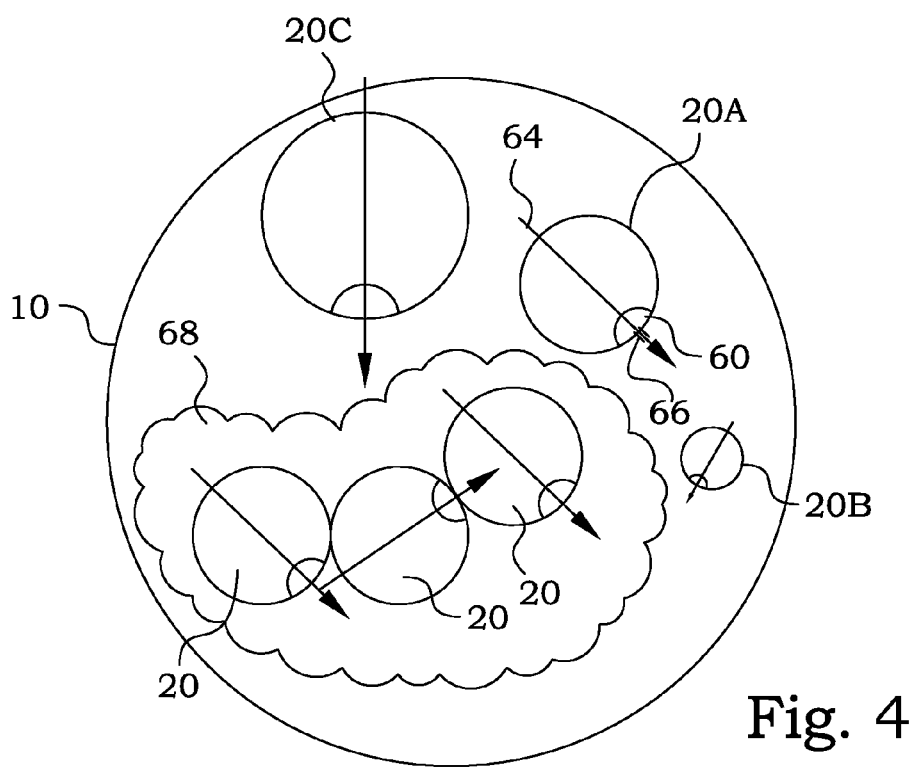
FIG. 4 is an illustration of relations between gas emitting entities within a tank.

As indicated above, there is no requirement for the size of the gas emitting entities 20. As illustrated in FIG. 4, some of them can have a standard size 20A, and some can be smaller 20B or larger 20C. For practical reasons in many applications, a standard size can be anticipated being in the order of 10-50 mm in diameter. However, for large systems, such as e.g. larger vehicles, larger tanks could be feasible. For smaller systems, such as e.g. portable electronics, smaller sizes are suitable. If there is a symmetry axis 64 in the gas emitting entity 20, 20A-C it can be random oriented in the tank 10. A preferred area 66 in the shell of the gas emitting entity 20, 20A-C may exist, from which the stored gas is released. The gas emitting entities 20, 20A-C can be more or less detached from each other in the tank 10 or packed together in close clusters 68. The gas emitting entities 20, 20A-C are preferably designed in such a way that even if the gas exit area 66 is in direct contact with another gas emitting entity 20, 20A-C, it shall not effect the gas release efficiency. In general there is no need for orientation of a gas emitting entity 20, 20A-C versus another gas emitting entity 20, 20A-C even if they are in direct contact. The gas emitting entity 20, 20A-C is preferably designed in such a way that a possible failure of an individual gas emitting entity 20, 20A-C do not propagate to other gas emitting entities 20, 20A-C in the system.

Figure 5:
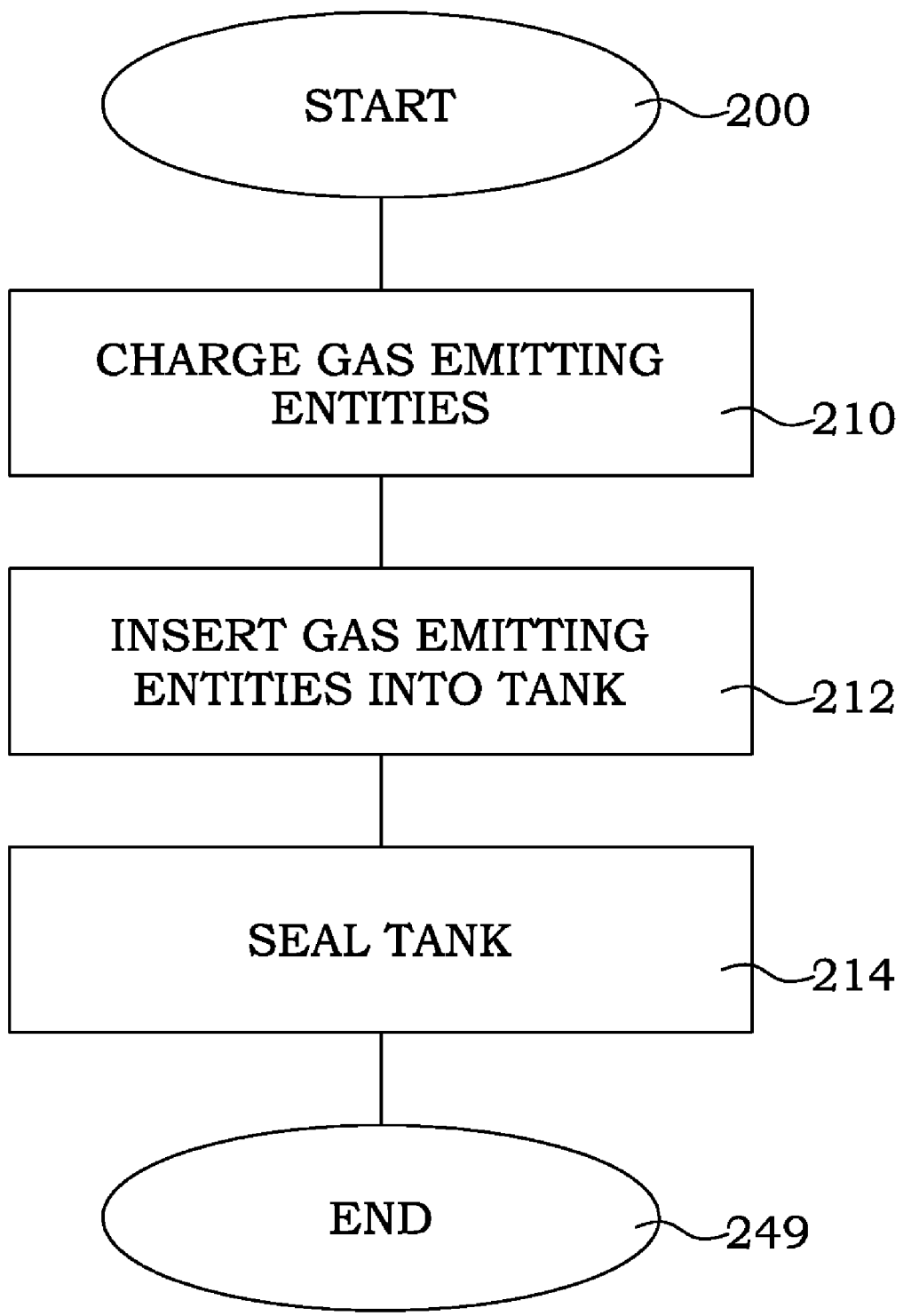
FIG. 5 is a flow diagram of steps of an embodiment of a method according to the present invention.

FIG. 5 is a flow diagram of steps of an embodiment of a method according to the present invention. A procedure for storing gas starts in step 200. In step 210, a multitude of gas emitting entities are charged to comprise a gas volume. The gas volume is, when released from said the emitting entities, considerably larger than a volume of the gas emitting entities themselves. The gas emitting entities are preferably propellant canisters, high-pressure gas container and/or containers in which gas is mechanically trapped in a solid or liquid. The multitude of gas emitting entities are in step 212 inserted into a tank to be freely contained therein. In step 214, the tank is sealed. The procedure ends in step 249.

Figure 6:
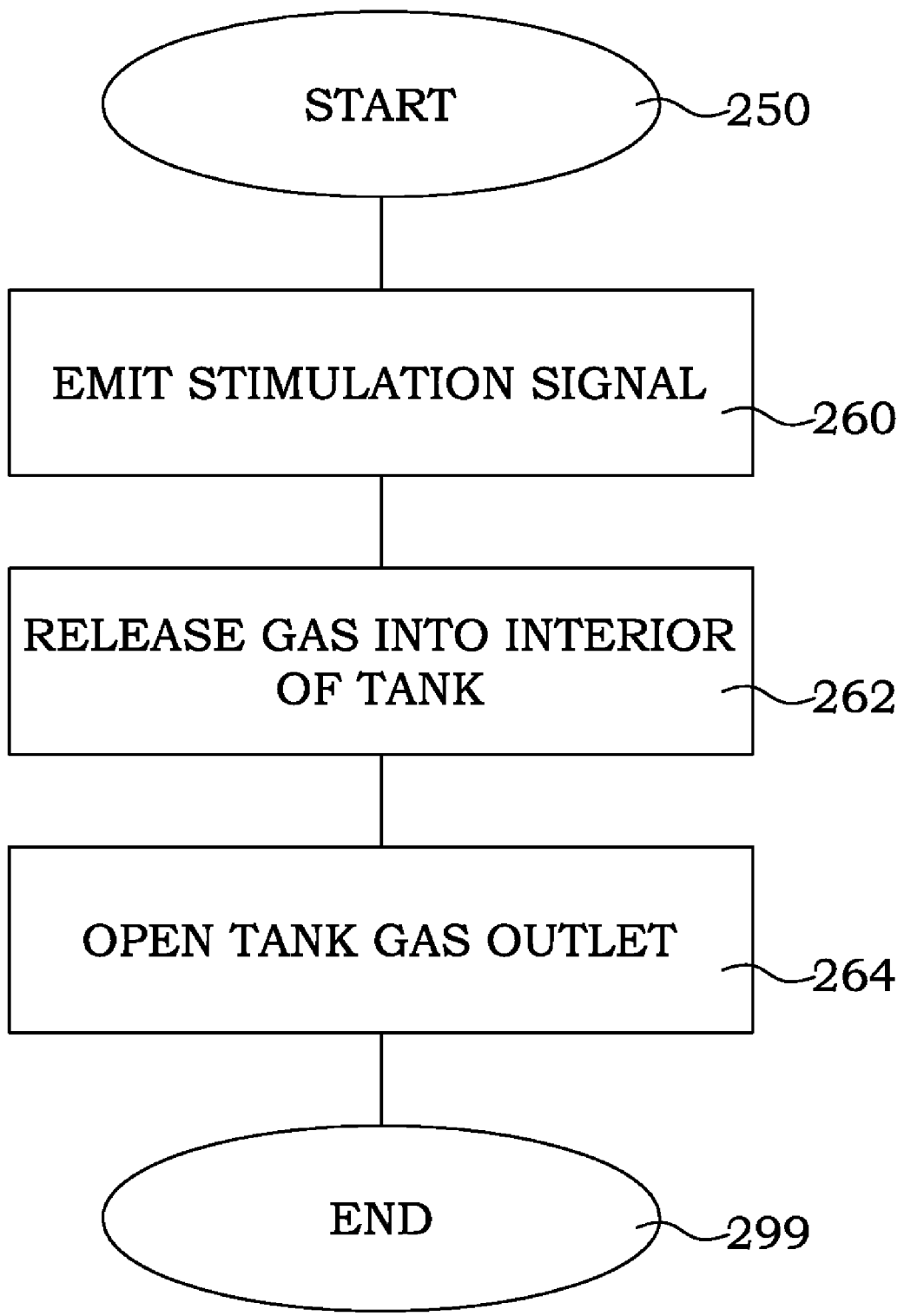
FIG. 6 is a flow diagram of steps of an embodiment of another method according to the present invention.

FIG. 6 is a flow diagram of steps of an embodiment of another method according to the present invention. A procedure for releasing gas from a gas storage starts in step 250. The gas storage comprises a tank encapsulating, freely contained therein, a multitude of gas emitting entities. The gas emitting entities are charged to comprise a gas volume, which when released from said gas emitting entities is considerably larger than a volume of the gas emitting entities themselves. The gas emitting entities are preferably propellant canisters, high-pressure gas container and/or containers in which gas is mechanically trapped in a solid or liquid. In step 260, a stimulation signal is emitted to a release device of at least one of the gas emitting entities. The stimulation signal can in different embodiments e.g. comprise an electromagnetic signal, a thermal signal, a pressure signal or an acceleration signal. Gas is in step 262 released into an interior of the tank from the stimulated gas emitting entity as a response to the stimulation signal. In a propellant canister a solid chemical substance is decomposed. In a high-pressure gas container, a valve mechanism is at least partially opened. In a container in which gas is mechanically trapped in a solid or liquid the gas is caused to be released from the solid or liquid. In step 264, a gas outlet of the tank is opened. The procedure ends in step 299.

Figure 7A:
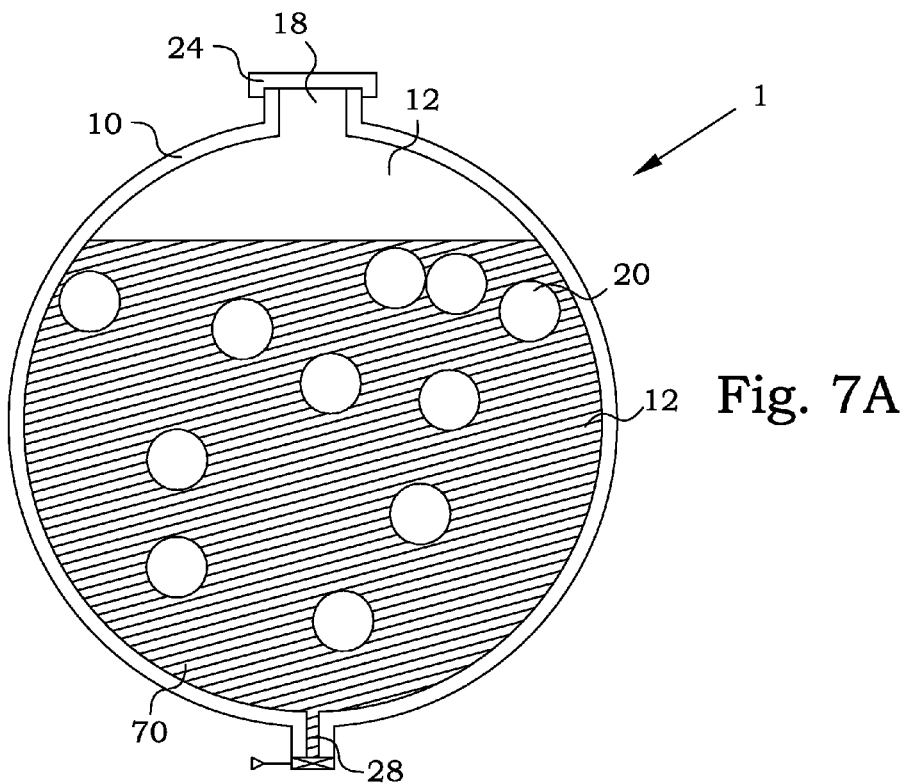
FIGS. 7A-B are cross-sections through a partly liquid filled tank.

FIG. 7A is a cross-section through a partly liquid filled tank 10. Another use for the gas emitting entities 20 is to combine a number of them together with a liquid 70 in a common tank 10. By the gas emitting entity 20, stimulation and resulting gas release, the tank 10 can be drained of the liquid under a pressure. This pressure is thereby controlled by the stimuli signal. Preferably, in this application for the system, the tank 10 is filled only with a few gas emitting entities 20. The main part of the internal volume 12 is filled with a liquid 70. By stimulating the high pressure gas filled gas emitting entities 20 is the whole system pressurized to a level controlled by the stimuli signal. In this way, the whole tank 10 can be drained on pressurized liquid 70 in a very simple way.

Figure 7B:
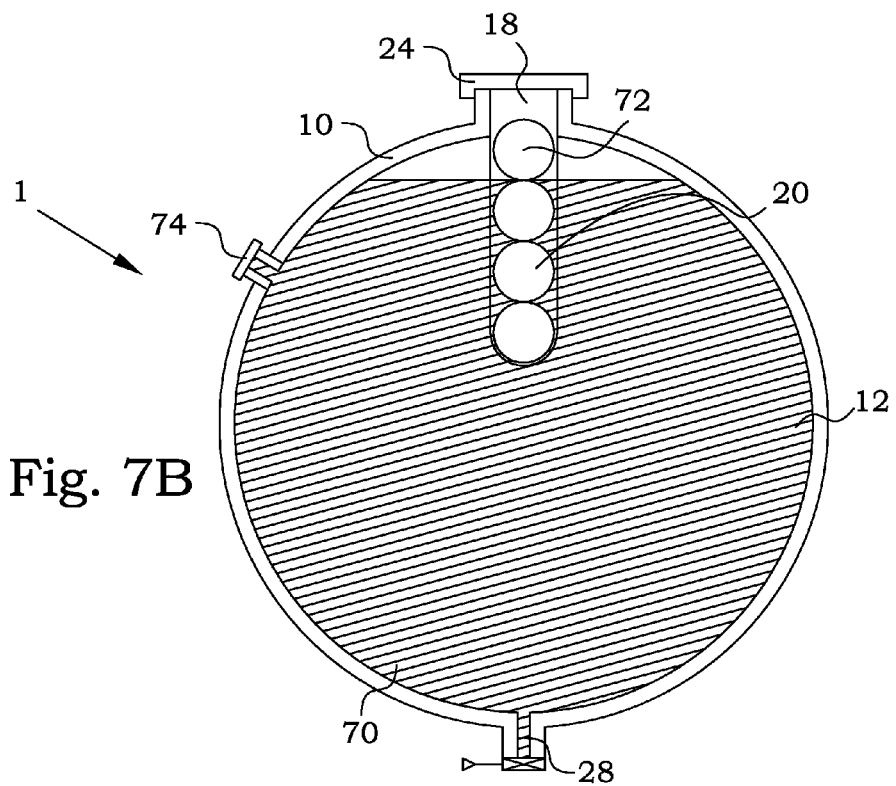

As illustrated in FIG. 7B, to simplify the removal of used gas emitting entities 20, they can be collected in a common cage 72 close to the sealable opening 18. The tank 10 can in this case preferably have an additional filling port 74 for the liquid 70.

The method to divide the total amount of gas needed for a certain application into a large number of small and easy to handle sub-supplies inside a large low pressure tank has two obvious advantages. First, due to scaling laws, the total system mass becomes lower, which is highly desirable in most mobile applications. Secondly, as the physical size of each sub-tank or propellant canister is only a small fraction of the total, the handling and refilling of the system becomes much more convenient. By use of the storage vessel as a large plenum filled with the working pressure of the gas, some other advantages are also achieved. All empty sub-tanks and dead volumes between them increase the plenum volume, without adding any extra mass to the system. On the safety side is an advantage that all small high pressure sub-tanks are protected inside the storage tank. If one or a few sub-tanks experience a total failure, by rupture or by other means, it has not a catastrophic consequence for the whole system. It might not even be noted from outside.

The embodiments described above are to be understood as a few illustrative examples of the present invention. It will be understood by those skilled in the art that various modifications, combinations and changes may be made to the embodiments without departing from the scope of the present invention. Also, different part solutions in the different embodiments can be combined in other configurations, where technically possible. The scope of the present invention is, however, defined by the appended claims.

The invention claimed is:

1. A gas storage system, comprising:
   a tank;
   said tank having a tank gas outlet; and
   a multitude of gas emitting entities encapsulated by said tank;
   said multitude of gas emitting entities being arranged for providing a gas volume, when released from said gas emitting entities, that is considerably larger than a volume of said gas emitting entities;
   said multitude of gas emitting entities being freely contained in said tank;
   said tank having a sealable opening suitable for removal or insertion of said multitude of gas emitting entities; and
   said multitude of gas emitting entities having a respective gas release device, being operable as a response on a stimulation signal.

2. The gas storage system according to claim 1, wherein at least one of said multitude of gas emitting entities being a propellant canister.

3. The gas storage system according to claim 1, wherein at least one of said multitude of gas emitting entities being a container in which gas is mechanically trapped in a solid or liquid.

4. The gas storage system according to claim 1, wherein at least one of said multitude of gas emitting entities being a high-pressure gas container.

5. The gas storage system according to claim 1, wherein said multitude of gas emitting entities having a space surrounding said gas emitting entities inside said tank as sole fluid connection between an opening of said gas emitting entity and said tank gas outlet.

6. The gas storage system according to claim 1, wherein said multitude of gas emitting entities are free to move inside said tank.

7. The gas storage system according to claim 1, wherein said multitude of gas emitting entities are contained in a support structure inside said tank.

8. The gas storage system according to claim 7, wherein said support structure is removable from said tank through said sealable opening.

9. The gas storage system according to claim 1, wherein said gas release device is situated within a shell of respective said gas emitting entities.

10. The gas storage system according to claim 1, wherein said gas emitting entities have a symmetry axis through an opening of said gas release device.

11. The gas storage system according to claim 10, wherein said symmetry axis can go through a mechanical contact point to another gas emitting entity wall without disturbing a gas release rate.

12. A method for storing gas, comprising the steps of:
charging a multitude of gas emitting entities to comprise a gas volume, when released from said gas emitting entities, that is considerably larger than a volume of said gas emitting entities;
inserting said multitude of gas emitting entities into a tank to be freely contained therein; and
sealing said tank,
wherein at least one of said multitude of gas emitting entities being a high-pressure gas container.

13. The method for storing gas according to claim 12, wherein at least one of said multitude of gas emitting entities being a propellant canister.

14. The method for storing gas according to claim 12, wherein at least one of said multitude of gas emitting entities being a container in which gas is mechanically trapped in a solid or liquid.

15. A method for releasing gas from a gas storage, comprising the step of:
opening a tank gas outlet of a tank;
said tank encapsulating, freely contained therein, a multitude of gas emitting entities, said gas emitting entities being charged to comprise a gas volume, when released from said gas emitting entities, that is considerably larger than a volume of said gas emitting entities;
emitting a stimulation signal to a gas release device of at least one of said multitude of gas emitting entities; and
releasing gas from said at least one of said multitude of gas emitting entities as a response to said stimulation signal into an interior of said tank.

16. The method for releasing gas according to claim 15, wherein at least one of said multitude of gas emitting entities being a propellant canister.

17. The method for releasing gas according to claim 16, wherein said step of releasing gas comprises decomposing a solid chemical substance in said propellant canister into at least said gas.

18. The method for releasing gas according to claim 15, wherein at least one of said multitude of gas emitting entities being a container in which gas is mechanically trapped in a solid or liquid.

19. The method for releasing gas according to claim 18, wherein said step of releasing gas comprises causing a release of said gas from said solid or liquid.

20. The method for releasing gas according to claim 15, wherein at least one of said multitude of gas emitting entities being a high-pressure gas container.

21. The method for releasing gas according to claim 20, wherein said step of releasing gas comprises opening, at least partially, of said high-pressure gas container.

* * * * *